(12) United States Patent
Proctor

(10) Patent No.: US 7,850,206 B2
(45) Date of Patent: Dec. 14, 2010

(54) AUTOMATIC FLAP LIFTER AND METHOD

(75) Inventor: Jeremiah C. Proctor, Brandywine, MD (US)

(73) Assignee: Flaps Up, LLC, Riva, MD (US)

( * ) Notice: Subject to any disclaimer, the term of this patent is extended or adjusted under 35 U.S.C. 154(b) by 283 days.

(21) Appl. No.: 12/123,666

(22) Filed: May 20, 2008

(65) Prior Publication Data
US 2009/0289446 A1 Nov. 26, 2009

(51) Int. Cl.
B62D 25/16 (2006.01)
(52) U.S. Cl. ........................ 280/848; 280/851
(58) Field of Classification Search ................ 280/847, 280/848, 851
See application file for complete search history.

(56) References Cited

U.S. PATENT DOCUMENTS

| | | | |
|---|---|---|---|
| 2,857,200 A | 10/1958 | Hoppesch | |
| 2,981,553 A * | 4/1961 | Zerbe, Sr. | 280/851 |
| 3,165,360 A | 1/1965 | Saxton et al. | |
| 3,203,710 A | 8/1965 | Harting, Jr. | |
| 3,248,126 A * | 4/1966 | Saxton et al. | 280/851 |
| 3,582,109 A * | 6/1971 | Moore | 280/851 |
| 3,794,383 A | 2/1974 | France et al. | |
| 3,802,739 A | 4/1974 | Knyszel et al. | |
| 3,806,196 A | 4/1974 | Cole et al. | |
| 3,806,197 A | 4/1974 | Knyszek et al. | |
| 3,905,616 A | 9/1975 | Tamburino et al. | |
| 4,097,090 A | 6/1978 | Payne et al. | |
| 4,221,432 A | 9/1980 | Van Remortel et al. | |
| 6,139,062 A | 10/2000 | Meyer | |
| 6,158,775 A * | 12/2000 | Nickels | 280/847 |
| 6,623,038 B2 | 9/2003 | Heem | |
| 6,799,808 B1 * | 10/2004 | Walters | 298/1 SG |
| 7,021,665 B2 * | 4/2006 | Keller | 280/848 |
| 2004/0164539 A1 * | 8/2004 | Bernard | 280/848 |

* cited by examiner

Primary Examiner—J. Allen Shriver, II
Assistant Examiner—John D. Walters
(74) Attorney, Agent, or Firm—Berenato & White, LLC

(57) ABSTRACT

The present invention relates to a mud flap lifting system for raising and lowering a pair of mud flaps connected to a rear portion of a vehicle and suspended behind corresponding rear wheels of the vehicle. A shaft extends between the mud flaps. First and second sheaves are disposed on the shaft, wherein each of the sheaves is aligned with one of the mud flaps. A pair of cables is provided, each of the cables having a first end connected to one of the sheaves and a second end connected to the correspondingly aligned mud flap. A motor is coupled to the shaft, wherein the shaft is axially rotated upon actuation of the motor. Each of the cables is coiled around the corresponding sheave upon rotation of the shaft in a first direction, thereby raising the mud flaps.

22 Claims, 4 Drawing Sheets

AUTOMATIC FLAP LIFTER AND METHOD

FIELD OF THE INVENTION

The present invention relates to a mud flap lifting system for raising and lowering a pair of mud flaps connected to a rear portion of a vehicle and suspended behind corresponding rear wheels of the vehicle.

BACKGROUND OF THE INVENTION

Mud flaps for vehicles are known in the art, and generally mandatory in many jurisdictions for certain types of vehicles such as dump trucks and other heavy trucks. Mud flaps are typically suspended from a truck body above the rear truck wheels, and prevent mud, stones or other debris from being ejected from the truck wheels and striking other motor vehicles or people.

Mud flaps that are suspended freely from the truck body are prone to being torn or dislodged when the truck is traveling in loose ground in reverse by coming in contact with the rear tires. Such damage is particularly prevalent with mud flaps used for dump trucks. As a dump truck discharges its load of material, the resulting pile of dumped material forms near the rear of the vehicle, and surrounds and buries the mud flaps. The mud flaps are then prone to tearing off as the dump truck pulls away from the dumped pile of material.

If the mud flaps are damaged or dislodged, they must be repaired or more likely replaced. Missing mud flaps may also result in government fines or other penalties. In addition, damage to other vehicles and people may arise if the mud flaps are dislodged or missing and fail to prevent debris from being ejected rearwardly from the truck wheels.

Attempts to provide mud flap systems that avoid the above-noted problems have been made. Various designs for automatic mud flap lifters for moving the flaps behind the rear wheels have been developed. Some conventional designs include a pulley system with a single long cable extending underneath the truck body. The single long cable is connected at the rear of the truck to two shorter cables, which are in turn each connected to the mud flaps. The cables are guided via one or more rollers, wherein typically the cables loop around numerous rollers in a complicated configuration. When the single cable is moved forward, the shorter cables curl the mud flaps upward. Other designs include a lever-type retraction apparatus instead of a pulley system. Such designs may include a lever arm pivotably coupled to the truck bed, which is activated by a cylinder and piston.

Such conventional designs require relatively long cables or straps which extend longitudinally along the truck body. They are difficult to install given they are typically spread out over the underbody of the truck. Moreover, the long cable extending underneath the truck is exposed to the elements and therefore easily damaged. In addition, the series of rollers in many pulley-type systems are overly complicated and the cables are prone to 'falling off' the rollers. Further, the control systems for such designs are relatively complicated, requiring a series of cylinders, valves and lines to actuate the system. Such systems may also rely on driver control.

Therefore, there is a need for a mud flap lifter system which solves some or all of the problems associated with conventional designs.

SUMMARY OF THE INVENTION

The present invention relates to an automatic mud flap lifting system for raising and lowering mud flaps, which is particularly beneficial for use on dump trucks. The lifting system raises the rear mud flaps to a safe position when the truck is shifted into reverse, for example, such as when a dump truck backs up and dumps its load. The mud flaps may then be lowered via an associated control switch in the cab of the truck.

A mud flap lifting system for raising and lowering a pair of mud flaps connected to a rear portion of a vehicle and suspended behind corresponding rear wheels of the vehicle according to an embodiment of the present invention is disclosed. A shaft extends between the mud flaps. First and second sheaves are disposed on the shaft, wherein each of the sheaves is aligned with one of the mud flaps. A pair of cables is provided, each of the cables having a first end connected to one of the sheaves and a second end connected to the correspondingly aligned mud flap. A motor is coupled to the shaft, wherein the shaft is rotated upon actuation of the motor. Each of the cables is coiled around the corresponding sheave upon rotation of the shaft in a first direction when the truck is shifted into reverse, thereby raising the mud flaps.

The present invention is also directed to a method of lifting mud flaps suspended behind rear wheels of a vehicle. A shaft having opposite ends and extending between a pair of mud flaps suspended behind rear wheels of a vehicle is provided, which includes a sheave disposed proximate each end of the shaft. Each sheave is linked to one of the mud flaps via a cable. The shaft is axially rotated so that that cables are coiled around the sheaves, thereby raising the mud flaps.

DETAILED DESCRIPTION OF PREFERRED EMBODIMENTS

Figure 1:
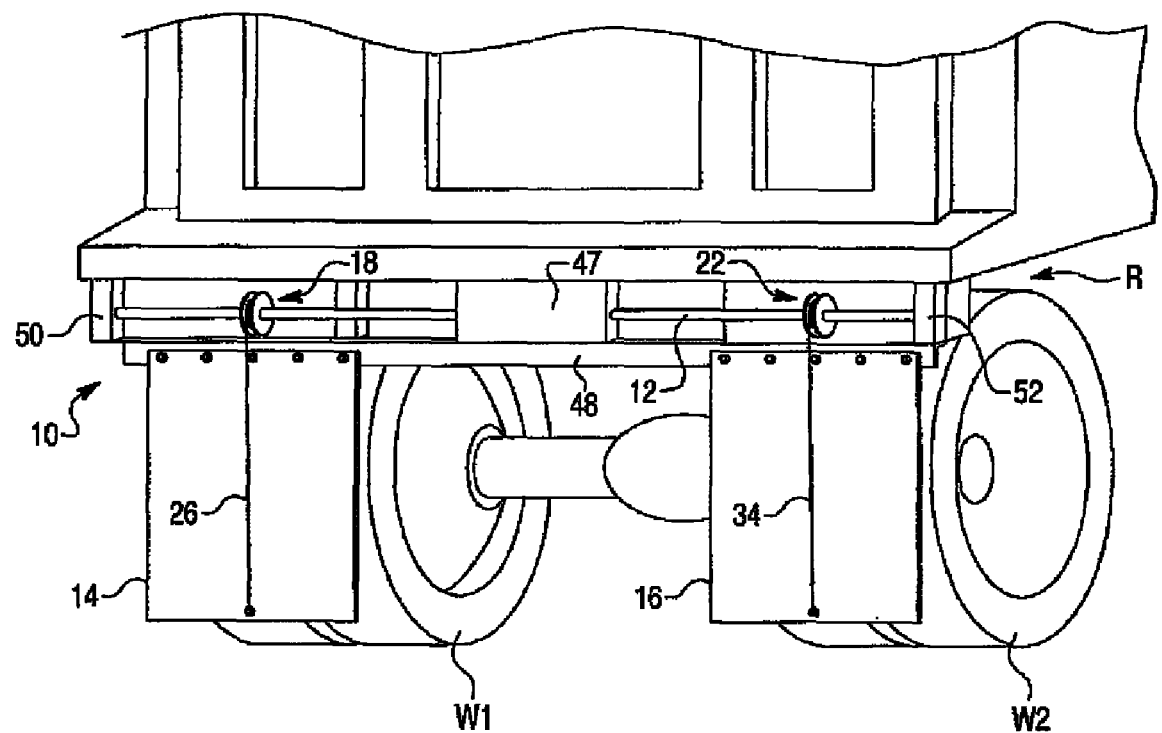
FIG. 1 is a fragmentary perspective view of a vehicle showing a mud flap lifting system according to an embodiment of the present invention secured to a rear portion of the vehicle.

A mud flap lifting system 10 according to an embodiment of the present invention is shown in FIGS. 1-4. System 10 includes a shaft 12 extending between first and second mud flaps 14, 16, which are connected to a rear portion R of a vehicle and suspended behind corresponding rear wheels W1, W2 of the vehicle, as shown in FIG. 1. A first sheave 18 is disposed on shaft 12 proximate a first end 20 thereof. A second sheave 22 is disposed on shaft 12 proximate an opposite second end 24 of shaft 12. First sheave 18 is preferably aligned with first mud flap 14, and second sheave 22 is preferably aligned with second mud flap 16.

Figure 4:
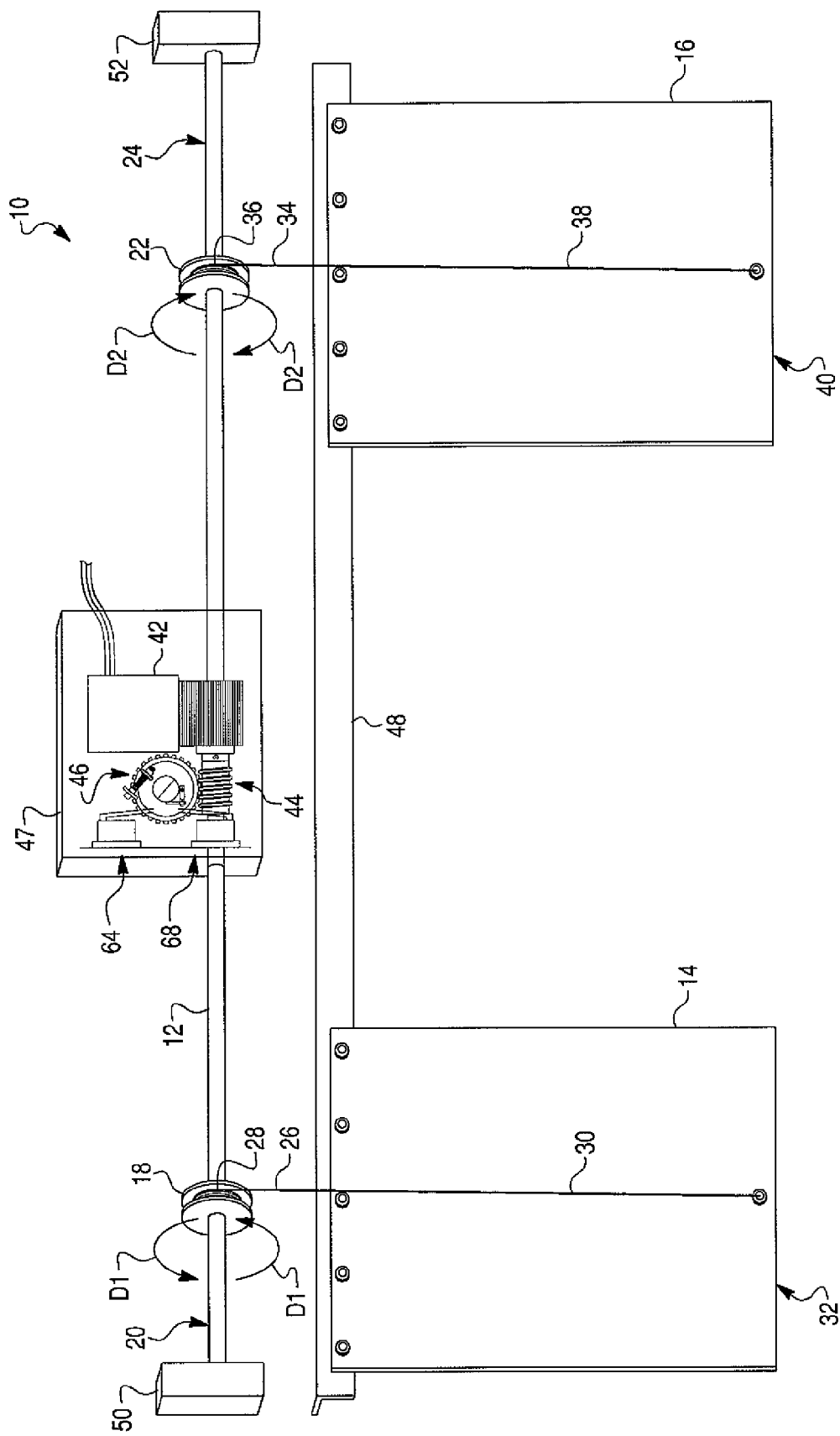
FIG. 4 is a perspective view of a mud flap lifting system showing a fragmentary sectional view of the housing and components therein.

A first cable 26 has a first end 28 connected to first sheave 18 and a second end 30 connected to first mud flap 14, preferably a lower distal edge 32 of mud flap 14 as shown in FIGS. 1 and 4. Similarly, a second cable 34 has a first end 36 connected to second sheave 22 and a second end 38 connected to second mud flap 16, preferably a lower distal edge 40 of second mud flap 16.

As shown in FIG. 4, a motor 42 is coupled to shaft 12 via a gear assembly. Motor 42 is preferably a DC electric motor. A suitable motor for use with the present invention is available from Bison Gear and Engineering Corporation of St. Charles, Ill. Motor 42 may be coupled to shaft 12 via a gear assembly having a worm 44 that meshes with a corresponding worm gear 46. Worm gear 46 is driven by motor 42, thereby rotating worm 44 when engaged with worm gear 46, which in turn rotates shaft 12. It would be readily apparent to one skilled in the art that alternative gear arrangements could be used to couple motor 42 to shaft 12. As such, the gear assembly described herein is exemplary only.

Motor 42 and the corresponding gear assembly are preferably disposed within a housing 47, which may be secured to the rear portion R of the vehicle via associated fasteners or welded thereto, as shown in FIG. 1. Shaft 12 extends through corresponding openings in opposite sides of housing 47. Housing 47 may be formed from sheet metal, or some other material sufficiently durable to withstand the elements, given it typically is mounted on the underside of most vehicles, and intermediate wheels W1, W2. As such, housing 47 protects motor 42 and the associated gear arrangement coupling motor 42 to shaft 12, as well as the electrical wiring to motor 42.

Figure 3:
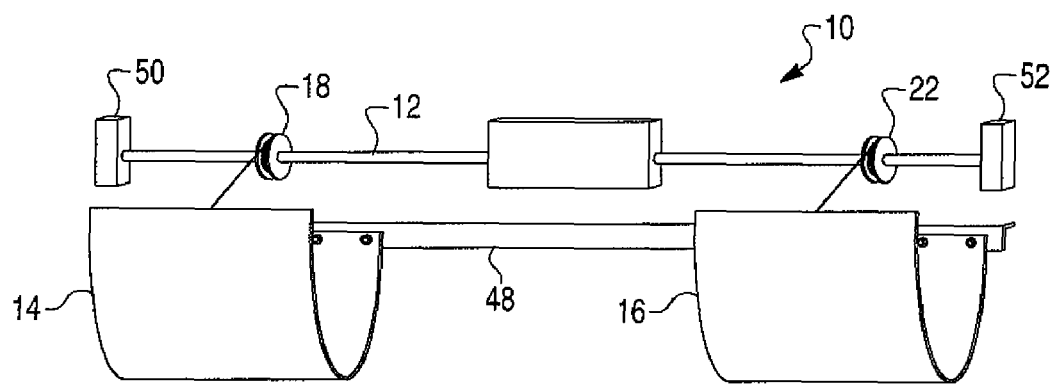
FIG. 3 is a perspective view of the mud flap lifting system showing the mud flaps in a raised position.

Preferably, motor 42 is electrically coupled to a transmission (not shown) operatively associated with the vehicle, such that motor 42 is actuated when an operator shifts the vehicle into reverse. In a preferred gear arrangement, a signal is transmitted to motor 42, which drives the associated gear assembly causing worm gear 46 to actuate worm 44. Specifically, motor 42 causes worm gear 46 to rotate, which in turn causes worm 44 and thus shaft 12 to axially rotate in a first direction, shown by arrows D1. Upon rotation of shaft 12, first and second sheaves 18, 22 disposed on shaft 12 proximate opposite ends 20, 24 thereof are caused to rotate in the first direction D1. As sheaves 18, 22 rotate in the first direction D1, first and second cables 26, 34 are coiled around the correspondingly aligned sheaves 18, 22. In this way, second ends 30, 38 of cables 26, 34 are pulled upward and toward sheaves 18, 22, thereby raising first and second mud flaps 14, 16, as shown in FIG. 3.

Cables 26, 34 are disposed rearwardly of flaps 14, 16. Thus, cables 26, 34 raise mud flaps 14, 16 rearwardly away from rear portion R of the vehicle. If cables 26, 34 were interiorly disposed relative to a support rail 48 (described in further detail below), mud flaps 14, 16 would be raised toward the vehicle and thus increase the risk of being torn from rail 48 should the vehicle continue to reverse its direction. It is thus preferred that cables 24, 34 extend over rail 48.

Figure 5:
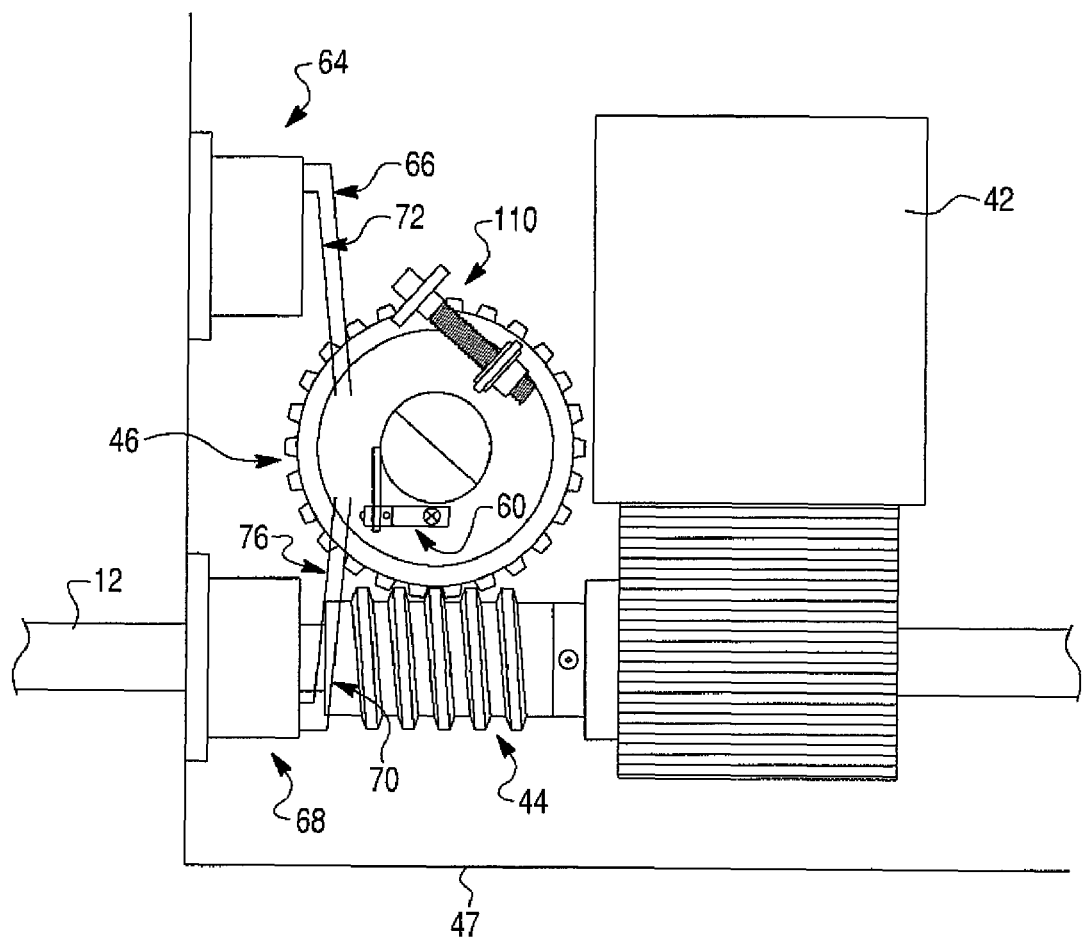
FIG. 5 is a perspective view of a portion of the housing and components shown in FIG. 4.
Figure 6:
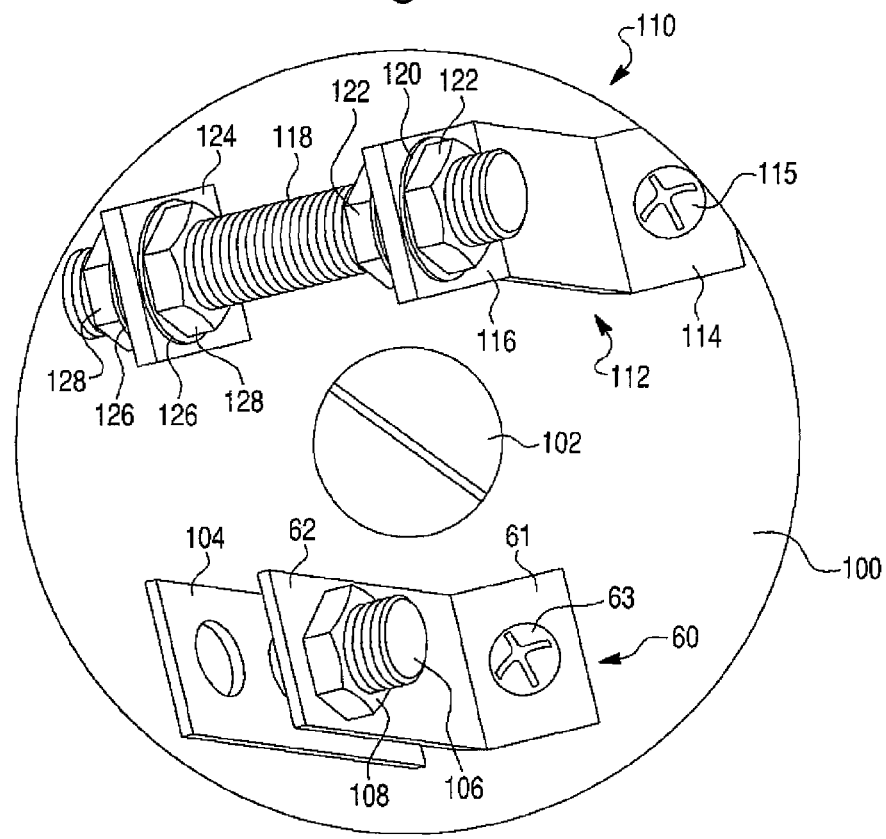
FIG. 6 is an enlarged perspective view of a portion of the components shown in FIG. 5.

Referring to FIGS. 5 and 6, worm gear 46 may include plate 100 extending outwardly thereof. Plate 100 and worm gear 46 are retained in position via an associated fastener 102, and rotatable about an axis thereof. Plate 100 and worm gear 46 may be separate components, or worm gear 46 may be machined to include an integrally formed plate 100. A first bracket 60 is mounted on plate 100. First bracket 60 may have an L-shaped configuration, with a first leg 61 bolted or otherwise secured to plate 100 via an associated fastener 63, and a distal second leg 62 extending outwardly therefrom. A first extension plate 104 may be bolted or otherwise secured to distal second leg 62, such as with a threaded bolt 106 and nut 108.

An arm assembly 110 is mounted to plate 100. Arm assembly 110 includes a second bracket 112. Second bracket 112 may include an L-shaped configuration, with a first leg 114 bolted or otherwise secured to plate 100 via an associated fastener 115, and a second leg 116 extending outwardly from plate 100. A threaded bolt 118 is secured to second leg 116 via a pair of associated washers 120 and bolts 122. A second extension plate 124 is secured to a distal end of threaded bolt 118 via a pair of associated washers 126 and bolts 128.

A first control module 64 is mounted to housing 47 and is in electrical communication with motor 42. First control module 64 includes an operably associated first micro switch 66, which is engageable with second extension plate 124 of arm assembly 110. Micro switches suitable for the present invention are available from McMaster-Carr Supply Company of Dayton, New Jersey. When motor 42 is automatically actuated upon the operator shifting into reverse, worm gear 46 is caused to rotate by actuation of motor 42, as described above. As worm gear 46 rotates, second bracket 112 and thus second extension plate 124 rotates therewith.

Second extension plate 124 is disposed at a predetermined position relative to first micro switch 66 and is engageable therewith upon counterclockwise rotation of worm gear 46. Second extension plate 124 thereby engages and actuates first micro switch 66 after worm gear 46 has rotated a predetermined angle of rotation. Upon actuation of first micro switch 66, first control module 64 sends a signal to motor 42 causing motor 42 to stop. In this way, worm gear 46 is only permitted to rotate and subtend a predetermined angle of rotation, and thus worm 44 and shaft 12 are rotated a predetermined number of rotations in first direction D1 sufficient to raise mud flaps 14, 16. Rotation of shaft 12 stops after the predetermined number of rotations upon actuation of first micro switch 66 by second extension plate 124.

The position of second extension plate 124 relative to first micro switch 66 may be easily adjusted by adjusting the position of second extension plate 124 on threaded bolt 118. For example, bolts 128 may be loosened, second extension plate 124 slid toward or away from second bracket 112, and then secured at the desired position by re-tightening bolts 128 against second extension plate 124. In this way, the predetermined angle of rotation of worm gear 46 may be adjusted, thereby adjusting the predetermined number of rotations of worm 44 and shaft 12. Lifting system 10 may therefore be easily adjusted to accommodate differently sized mud flaps 14, 16, which may require a different number of rotations in order to filly lift mud flaps 14, 16 to the raised position.

A second control module 68 is mounted to housing 47 and spaced from first control module 64, and is in electrical communication with motor 42. Second control module 68 includes an operably associated second micro switch 70. First bracket 60 is disposed at a predetermined position relative to second micro switch 68, so that first extension plate 104 is engageable therewith upon clockwise rotation of worm gear 46. First extension plate 104 engages and actuates second micro switch 68 after worm gear 46 has rotated a predetermined angle of rotation in a clockwise rotation, whereby shaft 12 is caused to rotate in a second direction opposite the first direction, shown by arrows D2 in FIG. 4.

Figure 2:
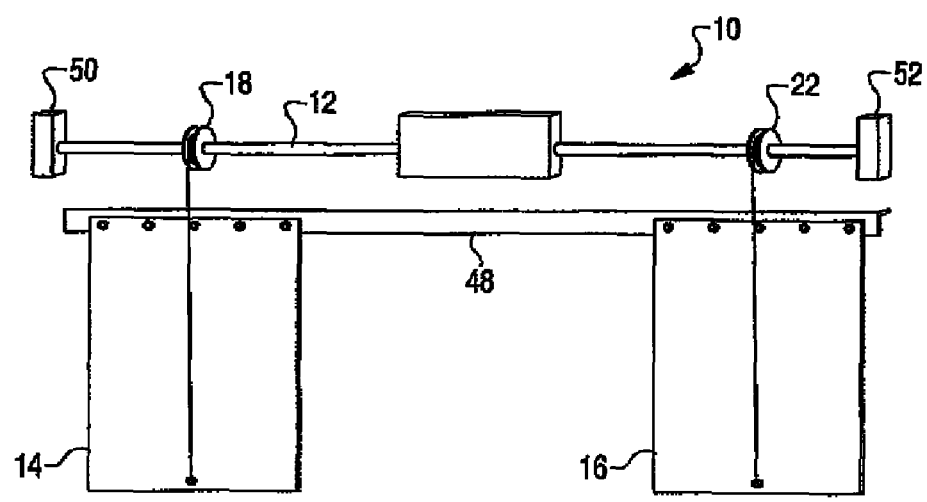
FIG. 2 is a perspective view of the mud flap lifting system showing the mud flaps in a lowered position.

Upon actuation of second micro switch 68, second control module 64 sends a signal to motor 42 causing motor 42 to stop. In this way, worm gear 46 is only permitted to rotate and subtend a predetermined angle of rotation, and thus worm 44 and shaft 12 are rotated a predetermined number of rotations in second direction D2. Rotation of shaft 12 in second direction D2 uncoils first and second cables 26, 34 from sheaves 18, 22, and the weight of mud flaps 14, 16 pulls second ends 30, 38 of cables 26, 34 downward to the lowered position, as shown in FIG. 2.

Once mud flaps 14, 16 have been lowered, rotation of shaft 12 stops via actuation of second micro switch 68. Thus, first bracket 60 and first extension plate 104 are positioned on plate 100 so that worm gear 46 is only permitted to rotate a predetermined angle of rotation, and thus shaft 12 is only permitted to rotate a desired number of rotations, and then stops upon actuation of second micro switch 68 by first extension plate 104.

The position of first extension plate 104 relative to second micro switch 68 may be adjusted by adjusting the position of first bracket 60, thereby adjusting the permissible angle of rotation of worm gear 46. For example, fastener 63 may be loosened, bracket 60 pivoted to a desired position, and fastener 63 re-tightened. Alternatively, the position of first control module 64 relative to worm gear 46 and thus bracket 60 may be adjusted. In this way, the predetermined number of rotations may be easily adjusted, given the number of rotations of shaft 12 corresponds to the rotational movement of worm gear 46. In addition, the length of cables 26, 34 may be adjusted, whereby cables 26, 34 are fully uncoiled from sheaves 18, 22 when mud flaps 14, 16 are in a fully lowered position.

In addition, the permissible angle of rotation of worm gear 46 in the first and second directions D1, D2 may be adjusted by altering the position of micro switches 66, 68 relative to first and second extensions 104, 124. For example, micro switches 66, 68 may be bent toward or away from worm gear 46, thereby effectively changing the position of micro switches 66, 68 relative to first and second extensions 104, 124. Thus, one skilled in the art would appreciate that other methods of adjusting the predetermined angle of rotation of worm gear 46 are possible.

Figure 7:
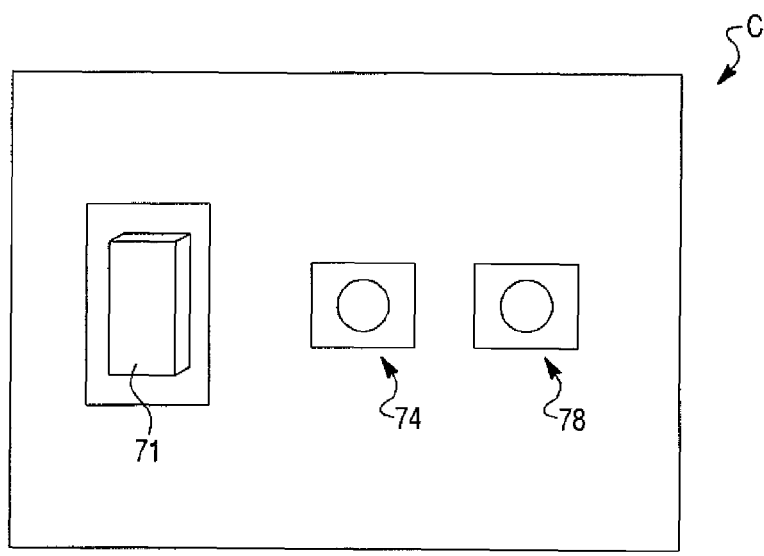
FIG. 7 is a plan view of an exemplary control panel for use with the disclosed lifting system.

Preferably, a control panel C is provided in the cab of the vehicle, such as shown in FIG. 7. Control panel C includes a control switch 71, which is in electrical communication with motor 42. When mud flaps 14, 16 are in a fully raised position, as shown in FIG. 3, motor 42 has been stopped via the signal from first control module 64 and actuation of first micro switch 66 by second extension plate 124.

In order to again lower mud flaps 14, 16 to their fully lowered position, such as shown in FIG. 2, the operator actuates control switch 71, which sends a signal to motor 42 and causes actuation of motor 42. However, the signal from control switch 71 causes motor 42 to rotate worm gear 46 in a direction opposite to that for raising mud flaps 14, 16, so that worm 44 and shaft 12 are rotated in the second direction D2. In this way, cables 26, 34 are uncoiled from sheaves 18, 22, and mud flaps 14, 16 lowered. Worm gear 46 continues to rotate, thereby lowering mud flaps 14, 16, until first extension plate 104 engages and actuates second micro switch 70. Upon actuation of second micro switch 66, second control module 68 sends a signal to motor 42 causing motor 42 to stop. Worm gear 46 rotates and subtends a predetermined angle of rotation, which causes worm 44 and thus shaft 12 to rotate a predetermined number of rotations in second direction D2 sufficient to lower mud flaps 14, 16. Rotation of shaft 12 stops after the predetermined number of rotations upon actuation of second micro switch 70.

Thus, the angle of rotation worm gear 46 is permitted to rotate in either a counterclockwise or clockwise direction is easily controlled and adjustable. As such, lifting system 10 may be easily adjusted to accommodate mud flaps 14, 16 of various lengths. It may also be necessary to adjust the angle of rotation of worm gear 46 depending on where lifting system 10 is secured to the vehicle.

Thus, shaft 12 is rotated a predetermined number of rotations when the operator shifts the vehicle into reverse, which sends a signal causing actuation of motor 42, thereby raising first and second mud flaps 14, 16 to a predetermined position relative to rear wheels W1, W2. Motor 42 automatically shuts off after causing shaft 12 to rotate the predetermined number of rotations via actuation of first micro switch 66, whereby worm gear 46 has subtended the predetermined angle of rotation in the counterclockwise direction. Shaft 12 is then maintained in a stationary position, thereby maintaining first and second mud flaps 14, 16 in the raised position until the vehicle operator actuates control switch 71, which causes motor 42 to rotate worm gear 46 in the opposite, clockwise direction and shaft to rotate in second direction D2 for lowering mud flaps 14, 16.

The number of rotations of shaft 12 required to raise first and second mud flaps 14, 16 to the fully raised position may vary depending on a number of factors, including: the position of first and second mud flaps 14, 16 relative to rear wheels W1, W2; the position of shaft 12 relative to first and second mud flaps 14, 16; the length of cables 26, 34; the configuration and size of first and second mud flaps 14, 16; the configuration and size of rear wheels W1, W2; the configuration and size of the vehicle; the gearing arrangement between motor 42 and shaft 12; and the diameters of shaft 12 and sheaves 18, 22. The predetermined number of rotations of shaft 12 may be selected by adjusting the position of second extension plate 124 relative to first micro switch 66, and/or the position of first extension plate 104 relative to second micro switch 68. In this way, lifting system 10 may be adjusted to accommodate a variety of different vehicles with varying configurations and requirements.

Preferably, first control module 64 includes a third micro switch 72, which is in electrical communication with a first indicator 74 on control panel C. Third micro switch 72 and first micro switch 66 are simultaneously actuated by second extension plate 124. First micro switch 66 causes motor 42 to stop, and thus stops farther rotation of shaft 12 in the first direction D1. Third micro switch 72 actuates first indicator 74, which preferably provides a visual signal for the vehicle operator indicating that mud flaps 14, 16 are in a fully raised position. For example, first indicator 74 may include a red light on control panel C, which upon activation notifies the operator that mud flaps 14, 16 are in the raised position. Auditory or other types of signals may also be provided.

Second control module 68 preferably includes a fourth micro switch 76, which is in electrical communication with a second indicator 78 on operator control panel C. Fourth micro switch 76 and second micro switch 70 are simultaneously actuated by first extension plate 104 on bracket 60. As described above, second micro switch 76 causes motor 42 to stop, and thus stops further rotation of shaft 12 in the second direction D2. Fourth micro switch 76 actuates second indicator 78, which preferably provides a visual signal for the vehicle operator that mud flaps 14, 16 are in a fully lowered position. For example, second indicator 78 may include a green light on control panel C, which upon activation notifies the operator that mud flaps 14, 16 are in a lowered position. Other types of signals may also be provided, as noted above.

Given motor 42 is coupled to the transmission of the vehicle, raising first and second mud flaps 14, 16 is independent of driver control. As such, the driver need not do anything other than shift the vehicle into reverse in order to raise mud flaps 14, 16. When mud flaps 14, 16 are fully raised, the driver is alerted via first indicator 74. The driver actuates control switch 71 when the driver wishes to lower mud flaps 14, 16. The driver is notified that mud flaps 14, 16 are in a fully lowered position via second indicator 78.

It would be readily apparent to one skilled in the art that various types of control switches 71 may be provided. Furthermore, if desired, an additional control switch in communication with motor 42 may be provided for raising mud flaps 14, 16, thereby allowing the driver to control both raising and lowering of the mud flaps 14, 16. Thus, lifting system 10 need not be coupled to the transmission of a vehicle if control switches are provided for both lowering and raising mud flaps 14, 16.

Motor 42 may be electrically coupled to the vehicle transmission via an electrical switch such as a standard 8 pin socket relay, which may include a timer or counter for actuating motor 42 after a predetermined period of time after the operator shifts into reverse. The switch operates in conjunction with the vehicle transmission for energizing motor 42. The relay may be disposed in the cab of the vehicle, such as within control panel C. The relay or other switch preferably controls the gear assembly, sending a first signal that causes actuation of motor 42 and clockwise rotation of worm gear 46 so that shaft 12 is rotated in the first direction D1. Motor 42 is then deactivated after worm gear 46 rotates the predetermined distance, as described above. Control switch 71 sends a second signal that causes actuation of motor 42 and counter-clockwise rotation of worm gear 46 so that shaft 12 is rotated in the second direction D2. Motor 42 is then deactivated after worm gear 46 rotates the predetermined distance, as describe above. One skilled in the art would understand that various electrical configurations may be used for coupling motor 42 to the vehicle transmission and relay to provide such control.

Depending on the configuration of rear portion R of the vehicle, a support rail 48 may be provided, from which first and second mud flaps 14, 16 hang. Support rail 48 may be a length of angle iron or some other sufficiently rugged material. Support rail 48 and shaft 12 may be substantially parallel, as shown in FIGS. 1-4. However, the exact configuration of support rail 48, or other support structure used to attach first and second mud flaps 14, 16, may vary depending on the configuration of rear portion R of the vehicle.

Cables 26, 34 are preferably secured to first and second mud flaps 14, 16 and disposed on an outer surface thereof, extending across the outwardly disposed faces of mud flaps 14, 16, relative to the rear wheels W1, W2. In addition, cables 26, 34 preferably extend over support rail 48, so lower distal edges 32, 40 are pulled outwardly and upwardly, away from rear wheels W1, W2, as shown in FIG. 3.

In order to ensure that shaft 12 and sheaves 18, 22 remain steady during rotation, and do not become misaligned or out of a desired position on the vehicle, first and second ends 20, 24 of shaft 12 may be rotatably disposed in first and second pillow block bearings 50, 52, respectively. Pillow block bearings 50, 52 may be mounted to the rear portion R of the vehicle, such as on a portion of the frame, thereby maintaining shaft 12, and therefore sheaves 18, 22, in a rotatably fixed position relative to the vehicle.

The system of the invention comprising housing 47, shaft 12 and sheaves 18, 22 is relatively compact and may be installed on essentially any dump truck body having mud flaps 14, 16. The system need not be specially designed for each truck body. Instead, it may be mounted to the rear portion R of the truck frame for ready installation.

It will be apparent to one of ordinary skill in the art that various modifications and variations can be made in construction or configuration of the present invention without departing from the scope or spirit of the invention. Thus, it is intended that the present invention cover all such modifications and variations, and as may be applied to the central features set forth above.

I claim:

1. A mud flap lifting system, comprising:
   first and second mud flaps connected to a rear portion of a vehicle and suspended behind corresponding rear wheels of the vehicle;
   a shaft extending between said first and second mud flaps;
   first and second sheaves disposed on said shaft, said first sheave aligned with said first mud flap and said second sheave aligned with said second mud flap;
   first and second cables, each of said cables having a first end connected to one of said first and second sheaves and a second end connected to a correspondingly aligned one of said first and second mud flaps;
   a motor coupled to said shaft, said shaft rotatable upon actuation of said motor, wherein each of said first and second cables is coiled around a corresponding one of said first and second sheaves upon rotation of said shaft in a first direction, thereby raising said mud flaps.

2. The flap lifting assembly of claim 1, wherein said motor is electrically coupled to a transmission operatively associated with the vehicle, said motor actuated so that said shafts rotate in said first direction when the vehicle is shifted into reverse.

3. The flap lifting assembly of claim 2, wherein said motor is electrically coupled to a control switch, said motor actuated so that said shaft rotates in a second direction opposite said first direction upon actuation of said control switch, causing each of said first and second cables to uncoil from the correspondingly aligned one of said first and second mud flaps, thereby lowering said mud flaps.

4. The flap lifting assembly of claim 1, further comprising a first control module in communication with said motor, wherein actuation of said motor is stopped after said shaft rotates a predetermined number of rotations in said first direction via actuation of a first switch operably associated with said first control module.

5. The flap lifting assembly of claim 4, further comprising a second control module in communication with said motor, wherein actuation of said motor is stopped after said shaft rotates a predetermined number of rotations in a second direction opposite said first direction via actuation of a second switch operably associated with said second control module.

6. The flap lifting assembly of claim 4, further comprising a first indicator coupled to said first control module, wherein actuation of a third switch operably associated with said first control module activates said first indicator.

7. The flap lifting assembly of claim 6, further comprising a second indicator coupled to said second control module, wherein actuation of a fourth switch operably associated with said second control module activates said second indicator.

8. The flap lifting assembly of claim 6, wherein said first and third switches are simultaneously actuated after said shaft rotates the predetermined number of rotations in said first direction.

9. The flap lifting assembly of claim 7, wherein said second and fourth switches are simultaneously actuated after said shaft rotates the predetermined number of rotations in said second direction.

10. The flap lifting assembly of claim 1, wherein said first end of each of said cables is connected to a lower edge of a corresponding one of said mud flaps.

11. The flap lifting assembly of claim 1, further comprising a support rail secured to the rear portion of the vehicle, said first and second mud flaps secured to said support rail.

12. The lifting assembly of claim 11, wherein said support rail and said shaft are substantially parallel.

13. The flap lifting assembly of claim 11, wherein said first and second cables extend over said support rail.

14. The flap lifting assembly of claim 1, wherein said motor is a DC electric motor.

15. The flap lifting assembly of claim 1, wherein said shaft is rotated a predetermined number of rotations in said first direction upon actuation of said motor, so that said first and second mud flaps are raised to a predetermined position.

16. The flap lifting assembly of claim 15, wherein said predetermined number of rotations is selectable.

17. The flap lifting assembly of claim 1, further comprising first and second pillow block bearings, wherein opposite ends of said shaft are disposed in a corresponding one of said first and second pillow block bearings.

18. The flap lifting assembly of claim 1, further comprising a housing secured to the rear portion of the vehicle, said motor disposed within said housing and said shaft extending through corresponding openings in opposite sides of said housing.

19. A mud flap lifting system, comprising:
   a mud flap connected to a rear portion of a vehicle;
   a sheave rotatably coupled to said rear portion in a fixed position relative to the vehicle and aligned with said mud flap;
   a cable having a first end connected to said sheave and a second end connected to said mud flap;
   a motor coupled to said sheave, said sheave rotatable upon actuation of said motor, wherein said cable is coiled around said sheave upon rotation in a first direction, thereby raising said mud flap.

20. A method of lifting mud flaps suspended behind rear wheels of a vehicle, comprising the steps of:
   providing a shaft having opposite ends and extending between a pair of mud flaps suspended behind rear wheels of a vehicle;
   providing a sheave disposed proximate each end of the shaft;
   linking each sheave to one of the mud flaps via a cable;
   axially rotating the shaft so that that cables are coiled around the sheaves, thereby raising the mud flaps.

21. The method of claim 20, including the further steps of:
   providing a motor coupled to the shaft; and
   axially rotating the shaft in a first direction by actuating the motor.

22. The method of claim 21, including the further steps of:
   coupling the motor to a transmission operably associated with the vehicle; and
   actuating the motor by shifting the transmission into reverse.

* * * * *